F. M. WEGNER.
FUR SHEARING MACHINE AND FUR UNHAIRING MACHINE.
APPLICATION FILED MAR. 2, 1918.

1,278,537.

Patented Sept. 10, 1918.

Inventor
Ferdinand M. Wegner
By his Attorney
Israel Benjamin.

UNITED STATES PATENT OFFICE.

FERDINAND M. WEGNER, OF BROOKLYN, NEW YORK.

FUR-SHEARING MACHINE AND FUR-UNHAIRING MACHINE.

1,278,537.  Specification of Letters Patent. Patented Sept. 10, 1918.

Application filed March 2, 1918. Serial No. 220,110.

*To all whom it may concern:*

Be it known that I, FERDINAND M. WEGNER, a citizen of the United States, residing at Brooklyn, in the county of Kings and State of New York, have invented a new and useful Improvement in Fur-Shearing Machines and Fur-Unhairing Machines, of which the following is a specification.

The objects of my improvement are:

First, to do away with the necessity of pinning fur skins on to the conveyer belt of a feeding mechanism in fur shearing machines and fur unhairing machines or to stitch the fur skins to each other.

Second, to provide a pneumatic means for holding the fur skins on said conveyer belt as they are fed forward, thereby saving the time and labor of pinning said skins to said conveyer belt and of stitching the skins to each other.

Third, to have said pneumatic means simple, durable and inexpensive.

I attain these objects by the mechanism illustrated in the accompanying drawings or by any mechanical equivalent or obvious modification of the same.

Figure 1:
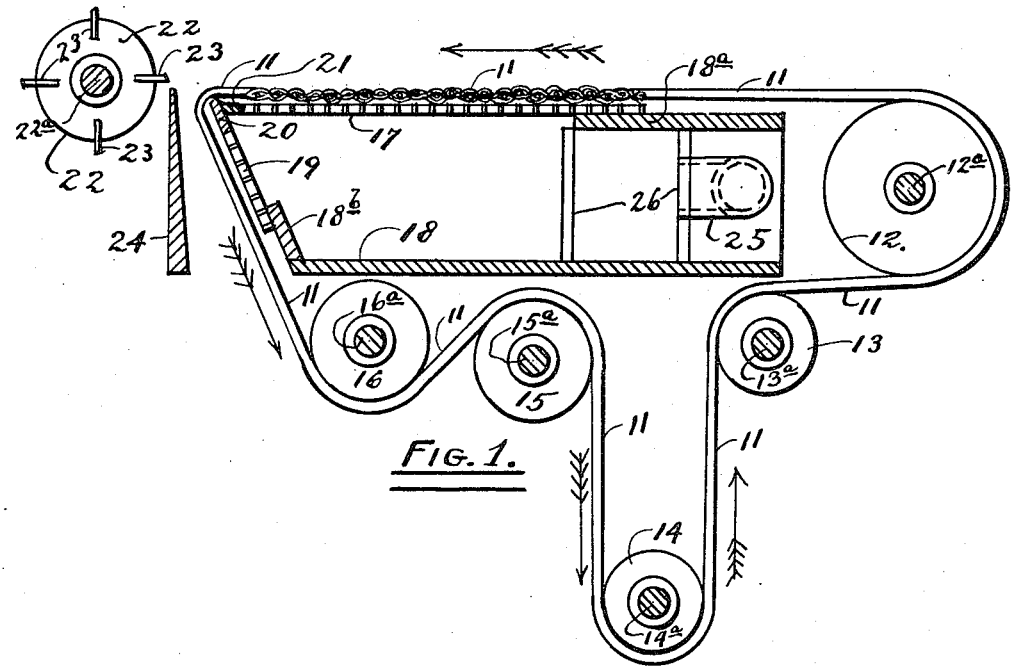
Figure 2:
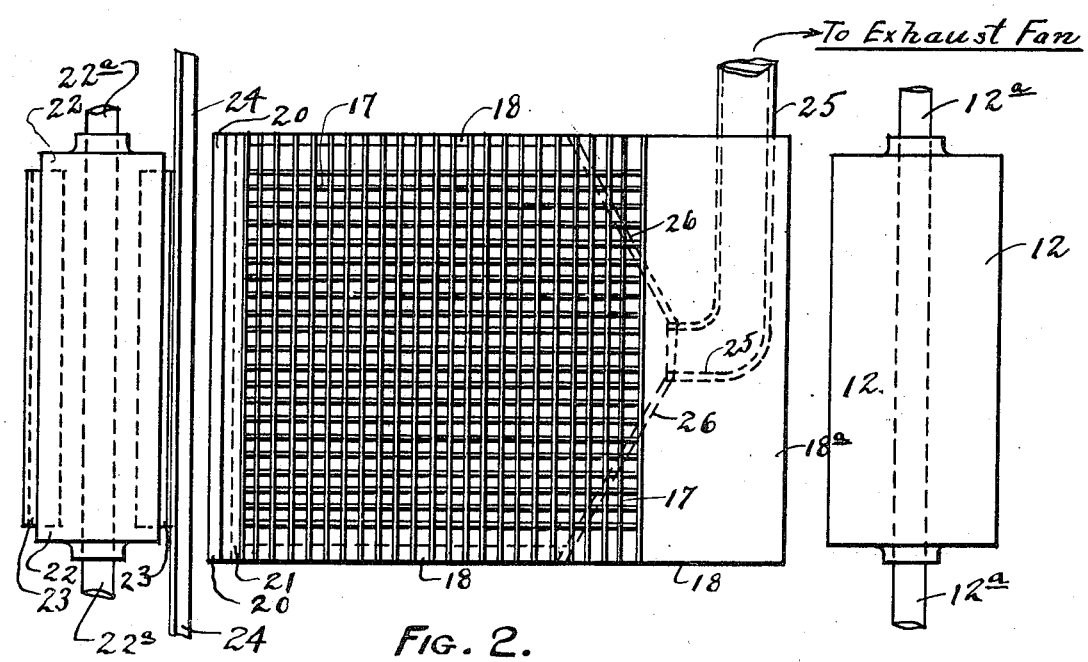

In the drawings Figure 1 is a side view, partly in section and partly in elevation of my pneumatic means for holding fur skins on the conveyer belt of a feeding mechanism of a fur shearing machine; Fig. 2 is a plan of the same, omitting the conveyer belt and sundry rollers of the feeding mechanism.

The frame of the machine and some other details thereof are omitted for the sake of clearness.

Similar numerals refer to similar parts throughout the two views.

11 designates the conveyer belt, which is shown in Fig. 1 partly in section and partly in elevation; 12, 13, 14, 15 and 16 are the feed rollers; 12ª, 13ª, 14ª, 15ª and 16ª are the shafts of said feed rollers, which propel said belt 11 in the direction shown by the arrows around the casing 18, which is shown as having an opening in the top 18ª thereof, which is covered by a grating 17, which is adapted to allow air to pass therethrough.

A sheet of wire gauze may be used instead of a grating, if desired.

The box 18 has an opening also in the front wall 18ᵇ thereof, which opening is shown as covered by the grating 19, which terminates at its upper edge in the bridge 20, over which the conveyer belt 11 is made to pass; the upper grating 17 is shown as terminating at its left end in the flat bar 21.

Said bar 21 and said bridge 20 form a sharp corner over which said belt 11 passes.

Said belt 11 may be made of coarse burlap or any other fabric adapted to allow the air to pass therethrough.

The fur skin is laid on the belt 11 at the rear end of the feeding mechanism and carried forward by the belt until the fur skin or a part thereof reaches the surface of the grating or wire gauze 17, when the skin is attracted to said grating 17 by the partial vacuum which is maintained inside the box 18 by means of the tube 25, which is adapted to communicate with a suitable exhaust fan, which is not shown in the drawings; said tube 25 is shown as connected to the tapered rear wall 26 of said box 18. The partial vacuum inside of said box is communicated to the underside of the fur skins through the openings in the grating or gauze 17 and the interstices of the fabric of said belt 11, which carries the fur skins over the plate 21 and the bridge 20, the fur of the skin reaching over the bridge 24, where it is cut by the blades 23 secured to the revolving member 22, which is mounted on the shaft 22ª.

The fur skin is held on to the belt 11 until it passes the grating 19 on the front of said box 18, when it drops by gravity to a suitable receptacle.

Many changes could be made in my pneumatic means for holding fur skins without departing from the main scope of my invention. I do not therefore restrict myself to the details of the device as shown in the drawings; but I intend to include also all mechanical equivalents and reasonably obvious modifications of the same.

What I claim as my invention, and desire to secure by Letters Patent is:

1. In a fur shearing machine and fur unhairing machine the combination of a conveyer for the fur skins, a casing encompassed by said conveyer and adapted to have a partial vacuum produced therein, a bridge or bar embodied in the front wall of said casing and forming part thereof, said bridge or bar forming with the top of said casing a sharp edge for said conveyer to pass thereover, thereby causing said fur skins to be bent at an acute angle abruptly and stretched over said edge, and multiple small openings in the top and front wall of said casing, said openings and said conveyer being adapted to communicate said partial vacuum to the underside of said skins, thereby holding the same on said conveyer while they are passed over said edge.

2. In a fur shearing machine and fur unhairing machine the combination of a conveyer for the fur skins, a casing encompassed by said conveyer and adapted to have a partial vacuum produced therein, a bridge or bar embodied in the front wall of said casing and forming part thereof, said bridge or bar having a sharp edge for said conveyer to pass thereover, thereby causing said fur skins to be bent at an acute angle abruptly and stretched over said edge, a grating on the top of said casing and a grating on the front wall thereof said first grating terminating at its front end in a flat bar, said second grating terminating at its upper end in said bridge, which is joined at its edge to said bar, and said gratings with said conveyer being adapted to communicate said partial vacuum to the underside of said skins, thereby holding the same on said conveyer while they are passed over said edge.

3. In a fur shearing machine the combination of a conveyer for the fur skins, a casing, having a cross-section of the form of a trapezoid, encompassed by said conveyer and adapted to have a partial vacuum produced therein, the parallel sides of said trapezoid being substantially horizontal and the acute angle of said trapezoid being at the front of said casing, a bridge or bar embodied in the front wall of said casing and forming part thereof, said bridge or bar forming with the top of said casing a sharp edge for said conveyer to pass thereover, thereby causing said fur skins to be bent at an acute angle abruptly and stretched over said bridge, and multiple small openings in the top and front wall of said casing, said openings and said conveyer being adapted to communicate said partial vacuum to the underside of said skins, thereby holding the same on said conveyer while they are passed over said edge.

FERDINAND M. WEGNER.